United States Patent [19]
Tritsch

[11] Patent Number: 5,460,300
[45] Date of Patent: Oct. 24, 1995

[54] CONTAINER WITH OPPOSED ATTACHABLE SPRAY HEAD AND PUMP

[75] Inventor: Gerhard Tritsch, Bietigheim, Germany

[73] Assignee: Raku GmbH, Rastatt, Germany

[21] Appl. No.: 79,342

[22] Filed: Jun. 16, 1993

[30] Foreign Application Priority Data

Jun. 16, 1992 [DE] Germany ................ 92 08 050.2 U
Feb. 19, 1993 [DE] Germany ................ 43 05 130.8

[51] Int. Cl.⁶ .................................................. B65D 83/14
[52] U.S. Cl. .................... 222/401; 222/402; 222/402.1
[58] Field of Search ............................. 222/401, 402, 222/402.1, 568

[56] References Cited

U.S. PATENT DOCUMENTS

| | | | |
|---|---|---|---|
| 1,067,999 | 7/1913 | Merritt | 222/401 X |
| 3,672,545 | 6/1972 | Marand | 222/402 X |
| 3,955,720 | 5/1976 | Malone | 222/401 X |
| 4,492,320 | 1/1985 | Tada | 222/401 X |
| 5,209,379 | 5/1993 | Dahlin | 222/401 |

FOREIGN PATENT DOCUMENTS

| | | |
|---|---|---|
| 0037496 | 10/1981 | European Pat. Off. . |
| 0267987 | 5/1988 | European Pat. Off. . |
| 0338844 | 10/1989 | European Pat. Off. ........ 222/401 |
| 4-154575 | 5/1992 | Japan ........................ 222/402.1 |
| 9006814 | 6/1990 | WIPO . |

OTHER PUBLICATIONS

Patent Abstracts of Japan, vol. 12, No. 432 (M–763) (3279) 15, Nov. 1988 & JP-A-63 165 118 (Ushigoro Sumitomo) 8. Jul. 1988.

Primary Examiner—Andres Kashnikow
Assistant Examiner—Joseph A. Kaufman
Attorney, Agent, or Firm—Martin A. Farber

[57] ABSTRACT

A method for the manufacture of a substantially cylindrical, possibly conical, container (1) having a first (upper) opening (10) and a second (lower) end opening (28), in which connection, starting from a plastically deformable plastic tube (39) produced by an extruder, the container (1) is shaped in a blowing method by a blow mandrel (52) introduced into the first upper opening (10). In order to permit simple but nevertheless precise manufacture, the second (lower) opening (28) is closed by an axially movable closure mandrel (42).

10 Claims, 8 Drawing Sheets

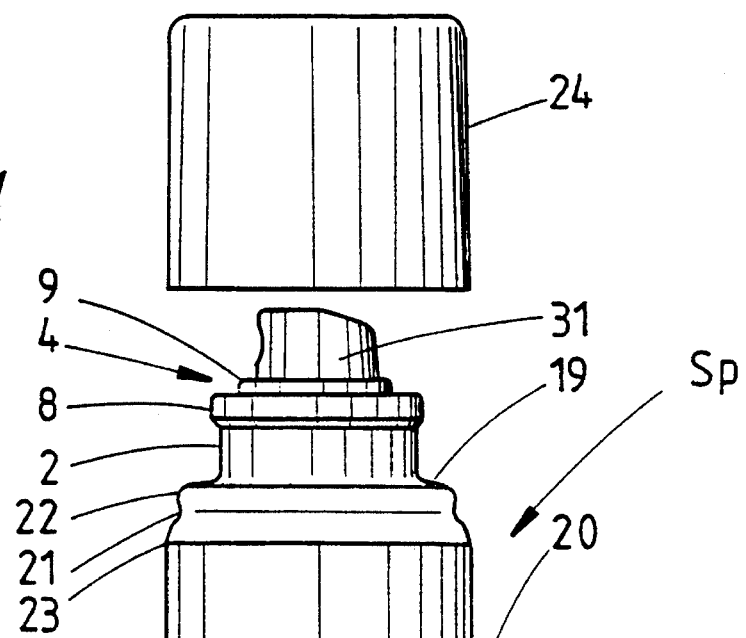
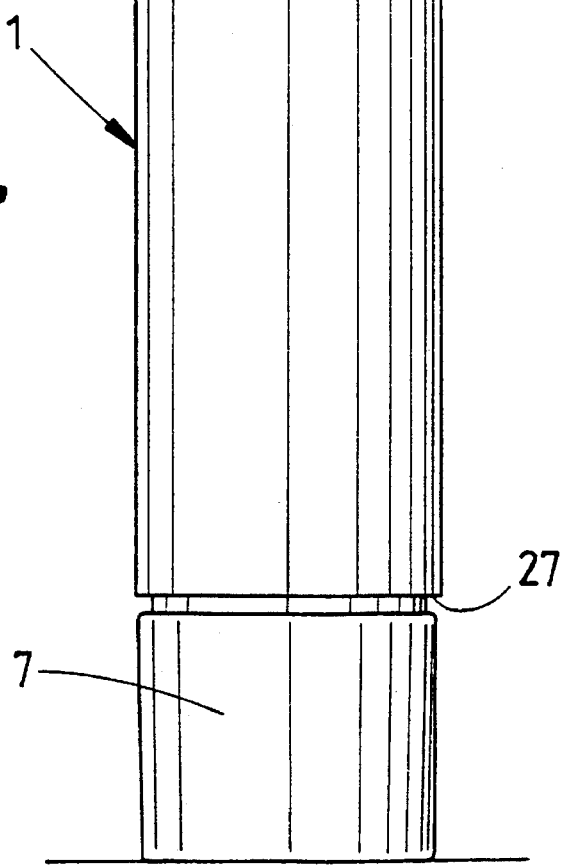

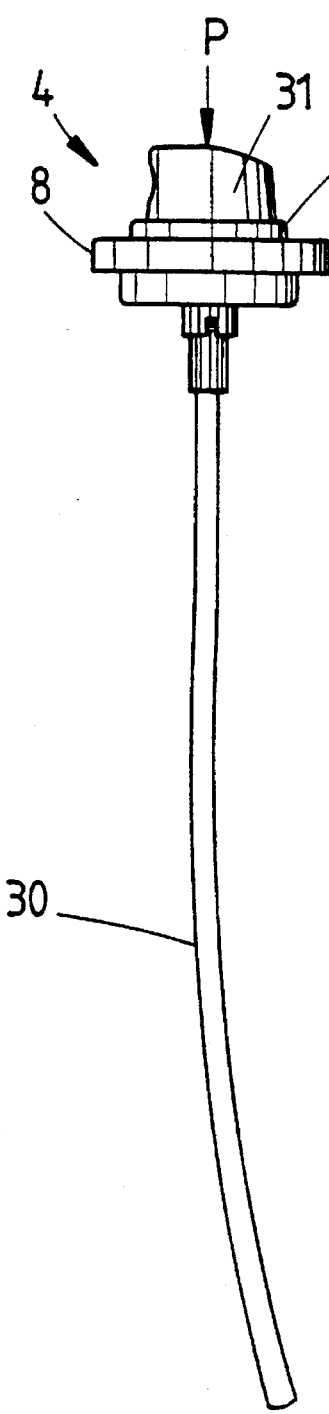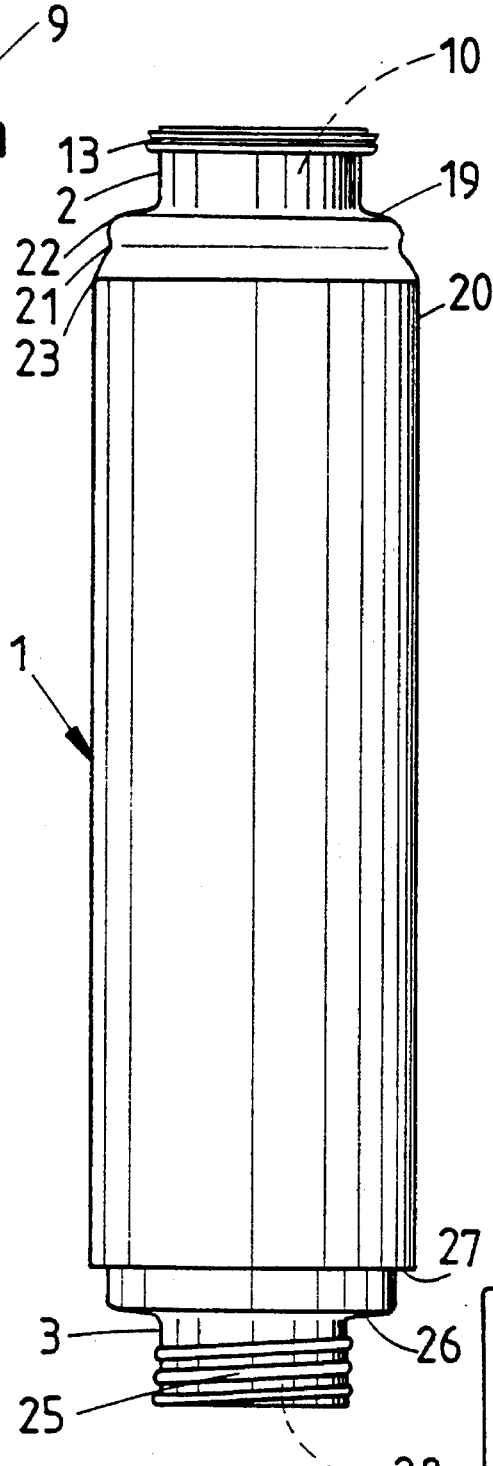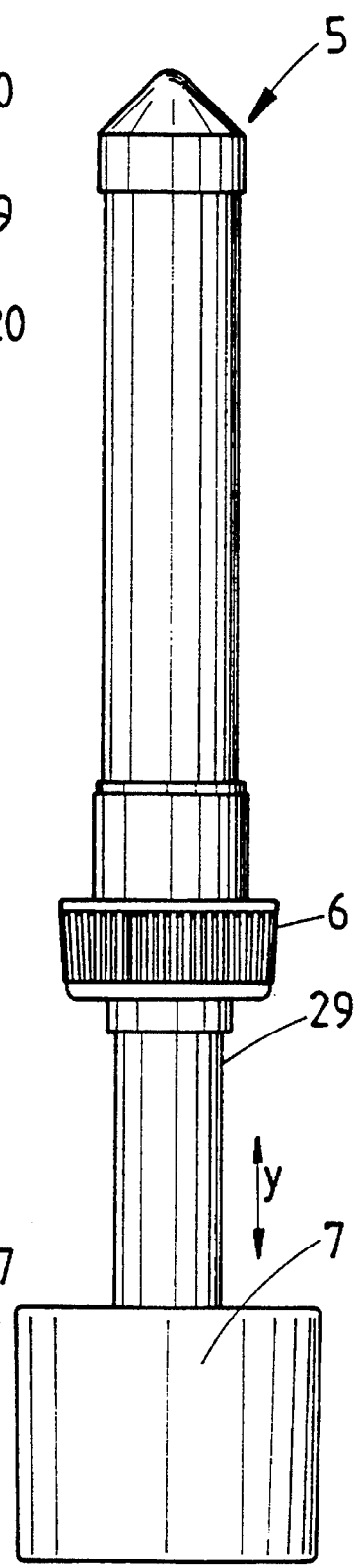

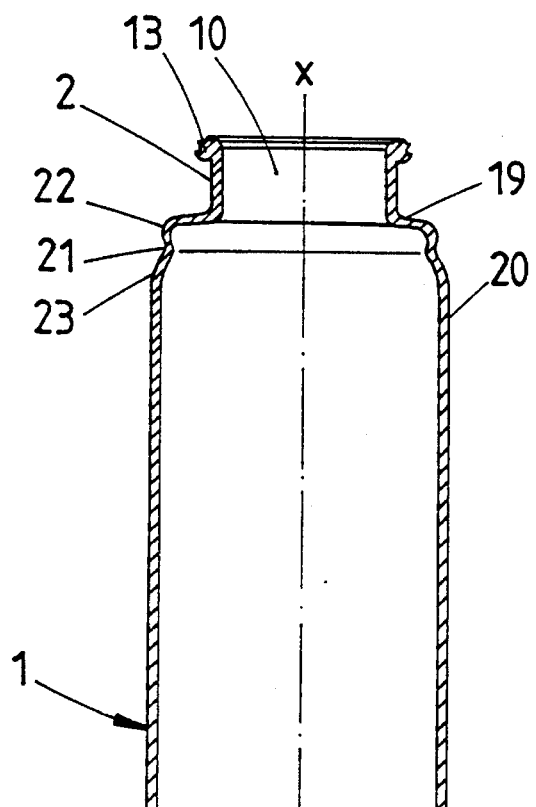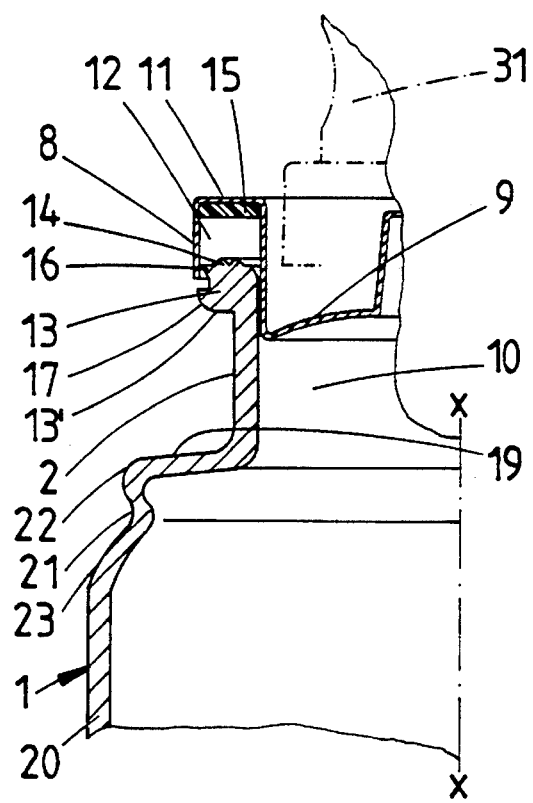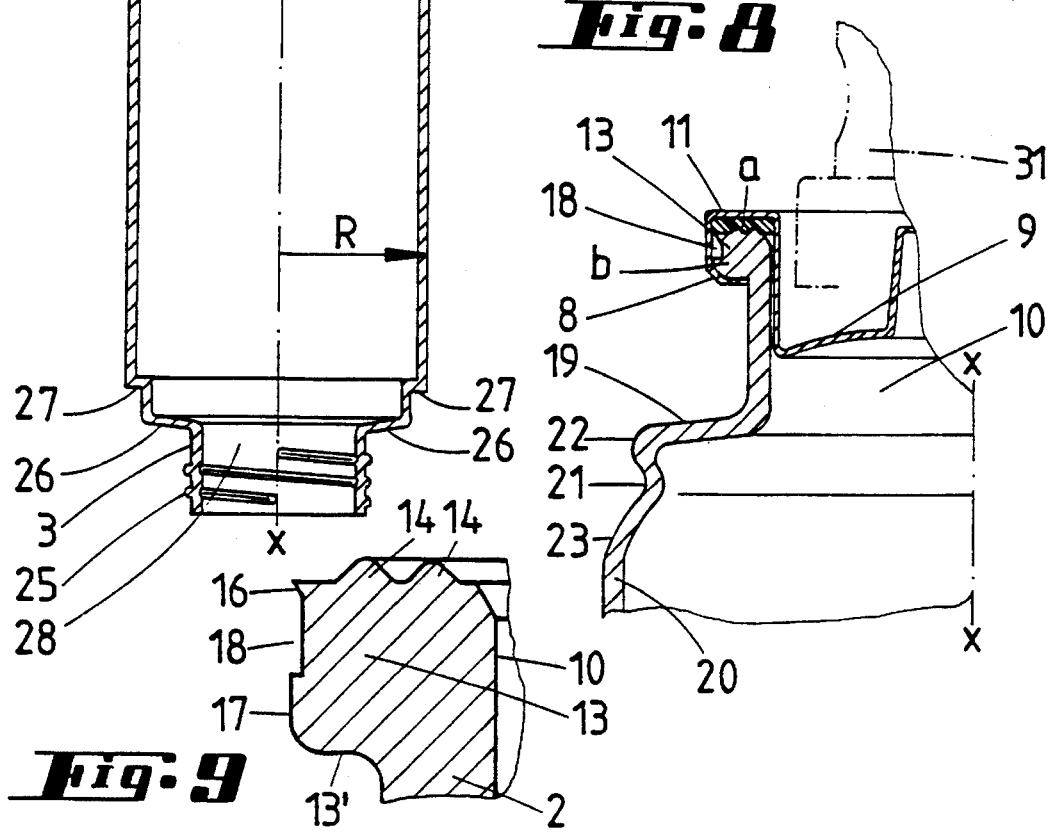

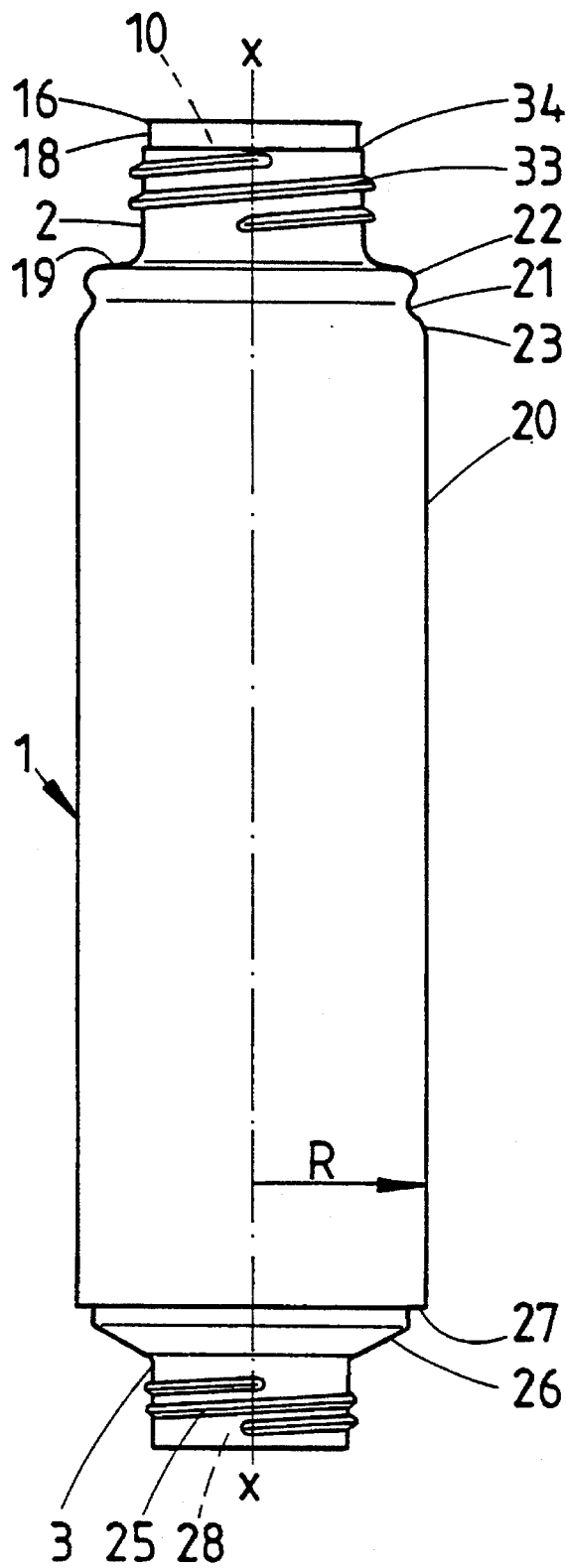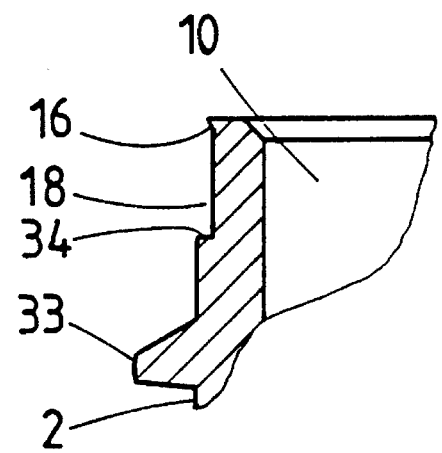

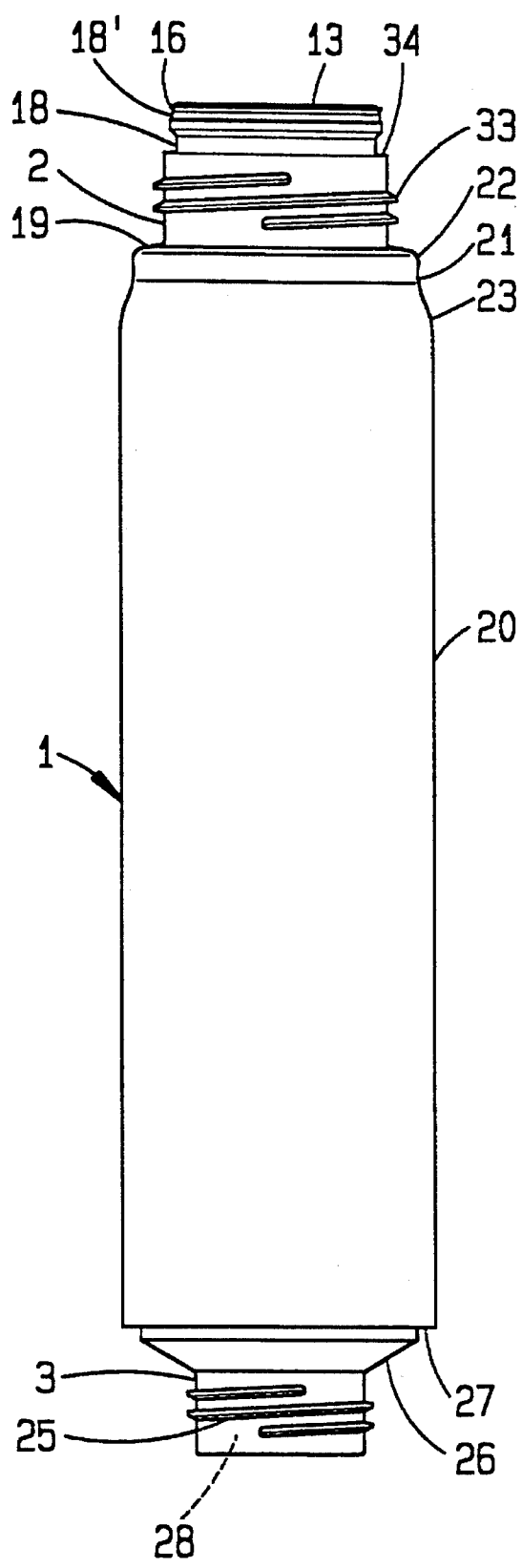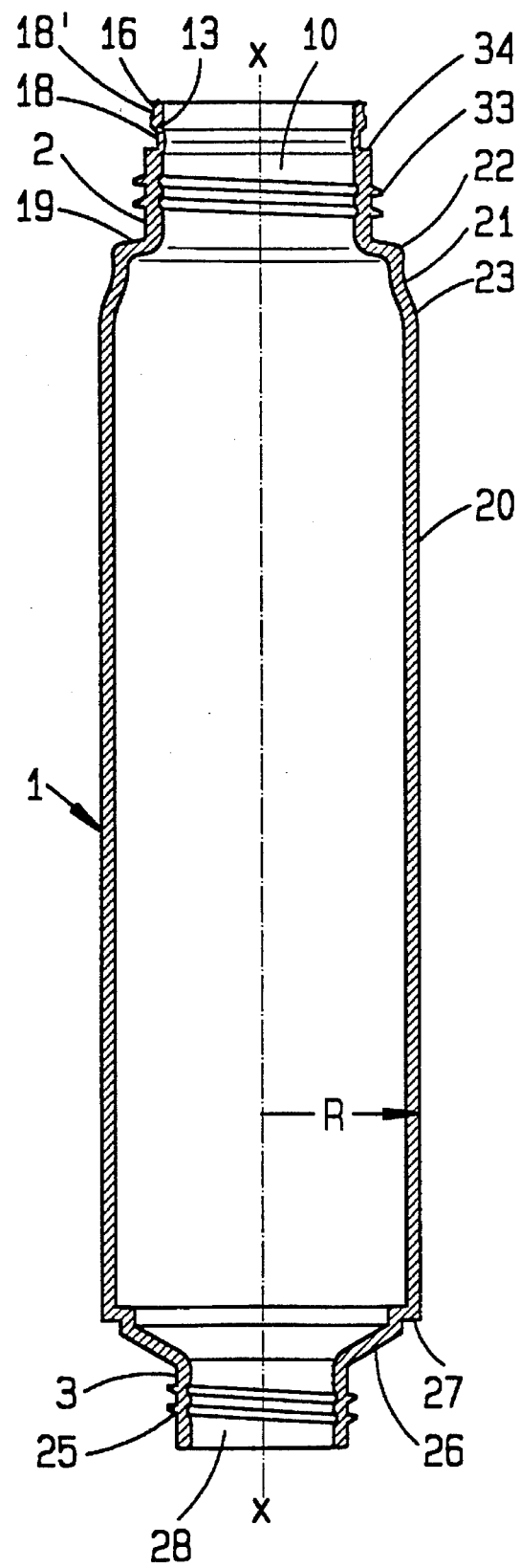

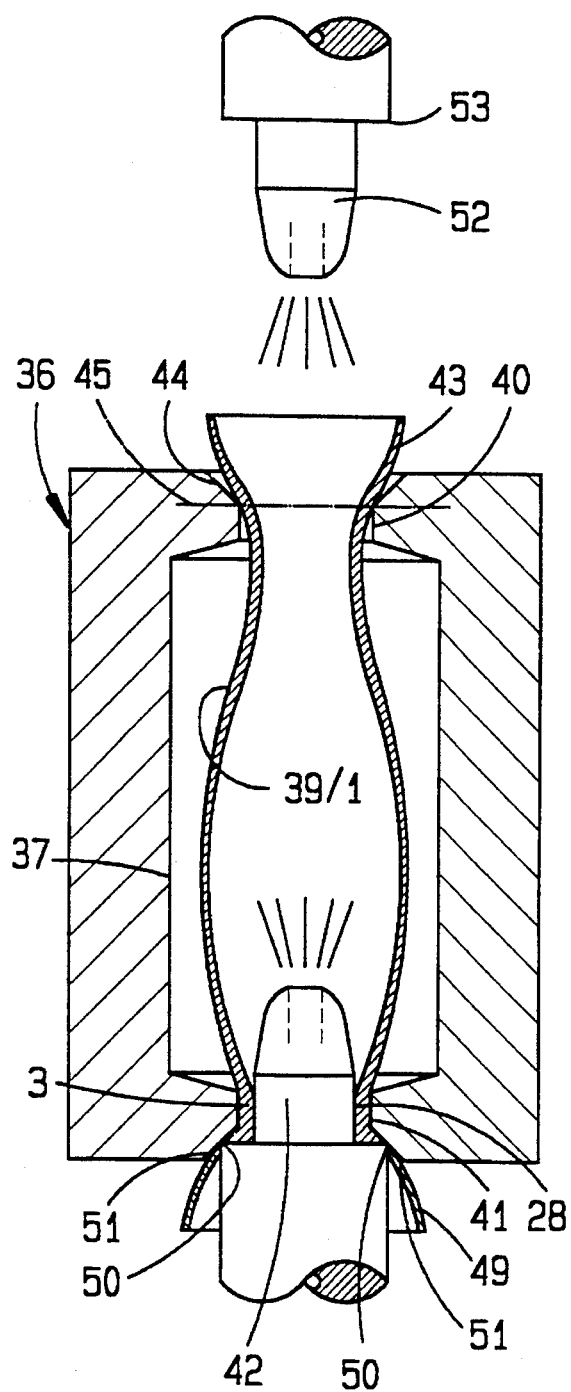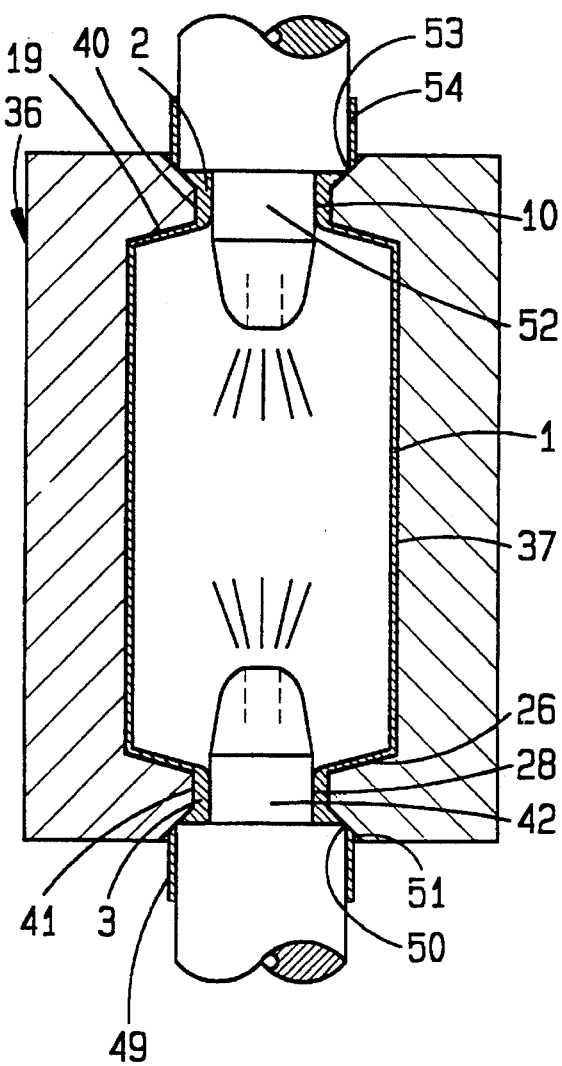

CONTAINER WITH OPPOSED ATTACHABLE SPRAY HEAD AND PUMP

FIELD AND BACKGROUND OF THE INVENTION

The present invention relates to a method for the production of a substantially cylindrical, possibly conical, container having a first upper and a second lower end opening, wherein, starting from a plastically deformable plastic tube produced in an extruder, the container is shaped in a blow molding process by a blow mandrel introduced into the first opening.

Containers which are open on both ends have been produced by first forming a deadhead by blowing on a side opposite a previously calibrated and completed opening. As a rule, routing is necessary. This, as can be readily seen, results in an expense which is excessive for a mass-produced article.

Such containers form the basic stock of dispensers available on the market. In this connection, one opening of the container is provided by threaded attachment with a spray-nozzle unit. The container can be refilled by the unscrewing of the spray-nozzle unit. The other, base-side opening of the container or dispenser is occupied by a pump. The cylinder of this pump protrudes from the inner edge of the bottom opening of the container, extends freely into the inside of the container, and is firmly attached to the inner edge of the opening, i.e. formed thereon. This requires a high degree of precision.

SUMMARY OF THE INVENTION

The object of the present invention is to provide a method which makes it possible to develop dispensers of this type in a manner which is simple but nevertheless precise and therefore favorable with respect to assembly and use, as well as practically without seam and without final working.

As a result of the invention, a method of this type for the manufacture of containers is improved. Consideration of the so-called deadhead is eliminated, as well as the expensive additional work required by it. Rather, accessibility is obtained from the second end of the container, which substantially improves the process, by closing the second opening (no longer by a tube closure place, i.e. head) by an axially displaceable closure mandrel. In this way, this opening region can be better controlled from the standpoint of molding technique and be included in the shaping and cutting steps. In a method in which a blow mold is provided, it is furthermore proposed that a thread-forming or similar mounting development be carried out both with the blow mandrel and also by means of the closure mandrel at the same time via radial pressing in a neck region of the opening. Another mounting development would, for instance, be a flange bead. The latter, as well as the forming of the thread, appear as forming sections lying as imprints in the opening region of the mold. From a manufacturing standpoint, it is advantageous in this connection for the plastic tube to be widened on the extruder side, this in order that a diameter of the widening region exceeds a diameter of the neck region of a blow mold. In this way, the section of the plastic tube to be shaped into a container is reliably held in the blow mold.

The widening region is formed by the introduction of blow air, preferably from the bottom of the tube, due specifically to a second path which has been freed. Then the plastic tube is cut substantially perpendicular to the length of the tube at the largest diameter of the widening region. In this way, there is obtained an advantageous widening socket for a closure mandrel which is to be brought up from below, as well as a useful collecting funnel for the blow air. It is advantageous for manufacture if the closure mandrel is, first of all, introduced into the second (lower) opening and the blow mandrel then introduced into the first (upper) opening. Therefore, the lower end is closed by way of priority. The rest of the shaping of the body of the container is now effected in the approximately cylindrical course of the wall and in the shoulders in front of a neck region. In the case of products having a large mouth opening, and therefore, for instance, an inside diameter of more than 28 mm, the tube can be supported during shaping by pressing, by a vacuum produced in the region of the neck.

In a container for the spray dispensing of liquid produced in accordance with the method of the invention, having a spray nozzle arranged on the head end of the container and a handle for a pump which extends on the base side into the container in order to produce a cushion of compressed air above the surface of a liquid in the container, the container being substantially in the shape of a cylindrical tube, it has been found advantageous that both the spray nozzle and the pump be fastened in non-detachable manner to the container. In the case of the aforementioned known dispenser, the cylinder, as stated, is firmly attached to the inner edge of the opening. This is necessary. The corresponding piston, which is provided with a handle, is introduced into the cylinder from the bottom. It is held merely by friction. The piston can be separated from the dispenser. This results in the danger of shifting.

As a result of the invention, a container of this type is also improved from the standpoint of attachment. The completely preassembled functional units are assembled with the use of both ends of the container. The container thus, in addition to its basic purpose, also acts as coupling member. Further procedures used in the prior art, and the use of the container also for forming of a part of a pump are eliminated. To this extent, deviations in tolerance of the container do not disturb the operation. The piston can no longer slip out. It is now an integral part of the pump functional unit. The attachment of the two functional units can be undone only by intentional removal. Such removal of a functional unit is basically advantageous for the refilling of the container and is here even of particular advantage since filling can be effected optionally from the top or from the bottom. It is also advantageous from the standpoint of the cleaning of the container that the two functional units can be detached from the container.

If this is not desired, it may also be advantageous, in certain cases, for the spray nozzle to be fastened to the container by gripping around a flange collar and for the pump to be held by means of a screw cap. By the gripping around a flange collar, which is irreversible as a general rule, a particularly firm association can be obtained, which favors the desired sealed closure. This structural unit is firmly installed only by the manufacturer, so that the filling or refilling takes place via the pump side, here simply by unscrewing the screw cap and removing the pump. This "free" attachment also permits the use of different pump systems, for instance with optimum consideration of the viscosity of the liquid to be sprayed or dispensed. Cylinders which can be loaded entirely differently therefore both from a volume standpoint and also from a standpoint of total force with respect to the pump can therefore be used.

Instead of the aforementioned threaded attachment on the pump side, an advantageous embodiment can, as an alternative, be obtained in the manner that both the spray nozzle and the pump are held by a threaded attachment. It is, in particular, also user-friendly that both the spray nozzle and the pump are held by a screw cap. Furthermore it is favorable for both threads to have the same direction of rotation. This results in a pull which is transmitted over the container. Furthermore, it is proposed that the threaded sections of the container are of different diameter. There is thus an additional possibility of selection. It is also advantageous for the container to have, for the holding of the spray nozzle, an extension which forms a nipple which terminates in a flange bead. Such a flange bead as a mounting results in an extremely stable closure of the container due to the corresponding accumulation of material, since the bead extends like a tire around the nipple opening present there. The flange collar and the flange bead stabilize each other.

In order to obtain optimal sealing conditions between spray-nozzle unit and container, with inclusion of the container, it is furthermore proposed that the end surface of the flange bead have at least one sealing rib which extends concentrically to the nipple opening and cooperates directly or via a sealing ring in the bottom of the flange collar. If the container is made of viscoplastic material the flange bead can itself assume the function of a sealing ring; the conventional sealing ring can thereby even be dispensed with. Another advantageous development consists of two closely spaced concentric sealing ribs. An additional sealing area can be created in this connection even if the outer surface of the flange bead bears circumferential ribs. In addition, it is proposed that the extension which forms the nipple pass on the base side via a concave shoulder into an undercut detent groove. The latter serves, primarily, to receive mating detent means of a protective cap which grips over the spray nozzle. In this region, there is thus obtained a sort of bellows zone of the container which may suitably be developed as a blow container. The concave shoulder, i.e., the shoulder extending substantially perpendicular to the longitudinal central axis, of the cylindrical container results in an advantageous expandable supply, for instance if the dispenser is exposed unprotected to the sun, in which case bulge-like conditions can occur. Furthermore, this region is so developed that a bead on the extension side of the detent groove has a smaller outside diameter than the other, lower bead of the detent groove which passes directly into the cylindrical outer wall of the container. Due to this wall offset, there is obtained such a substantial indentation of the nipple-side bead, and therefore the upper bead, that the protective cap can align on the side of the outer wall with the outer wall of the container. The protective cap therefore would not be stripped off by a catching on any articles which are carried along.

With respect now to the lower, base-side end of the container, in this case, for the threaded attachment of the pump, the screw thread is developed on a lower nipple which passes, via a double shoulder having, in each case substantially flat shoulder surfaces into the cylindrical outer wall of the container. Here there is a greater polydirectionality of wall sections so that here identical bellows-like conditions are present, resulting, in addition, however in the advantage that the handle is held also there out of an exposed position with respect to the outer well due to the wall offset. The shoulder surfaces which extend here also substantially flat, i.e., perpendicular to the longitudinal central axis of the housing, are of different width. In this connection, a formula has been proven practical according to which the radial extent of the shoulder surfaces to the free end of the nipple present there corresponds to about one seventh and about one third respectively of the cross-sectional radius of the container. The transition to the neck-like extension of the nipple there is therefore wider, covered by the feature that the larger shoulder surface lies directly on the base side of the lower nipple. Finally, it is also of advantage that the upper nipple and the lower nipple are of approximately the same length. There is also an advantageous development due to a threaded flange bead extended over by the thread on the free end of the one end opening of the container. In this way, there remains an option, namely to attach the functional unit consisting of the spray nozzle by flanging and to use the thread then for a screwable protective cap or to attach a pump which can be screwed on from there.

BRIEF DESCRIPTION OF THE DRAWINGS

With the above and other and other advantages in view, the present invention will become more clearly understood in connection with the detailed description of three preferred embodiments, when considered with the accompanying drawings, of which FIG. 1 shows, in side view, a protective cap for covering a spray nozzle of a container;

FIG. 2, shows the completely equipped dispenser, minus the protective cap of FIG. 1, in a side view, according to the first embodiment;

FIG. 3 is a showing of the container itself, in side view;

FIG. 4 shows the corresponding spray-nozzle unit equipped with riser tube, seen by itself;

FIG. 5 shows the pump with handle, also by itself;

FIG. 6 is a vertical section through the container;

FIG. 7 is an enlarged view of the flange region between flange collar and flange bead before the flanging and FIG. 8 after the flanging;

FIG. 9 shows the flange edge in a further enlargement;

FIG. 10 shows the container by itself in side view, in accordance with the second embodiment;

FIG. 11 is an enlarged view of the upper end section of the container provided here with a thread;

FIG. 12 shows the container by itself in side view, in accordance with the third embodiment, FIG. 13 is a vertical section through this dispenser;

FIG. 17 is a view similar to that of FIG. 15, but with a closure mandrel introduced at the bottom and a blow mandrel entering into operation at the top; and FIG. 18 is a view similar to that of FIG. 17, but now also with the blow mandrel completely introduced and at the same time showing the calibrating and the cutting off of the so-called neck butts.

DETAILED DESCRIPTION OF THE PREFERRED EMBODIMENTS

Figure 14:
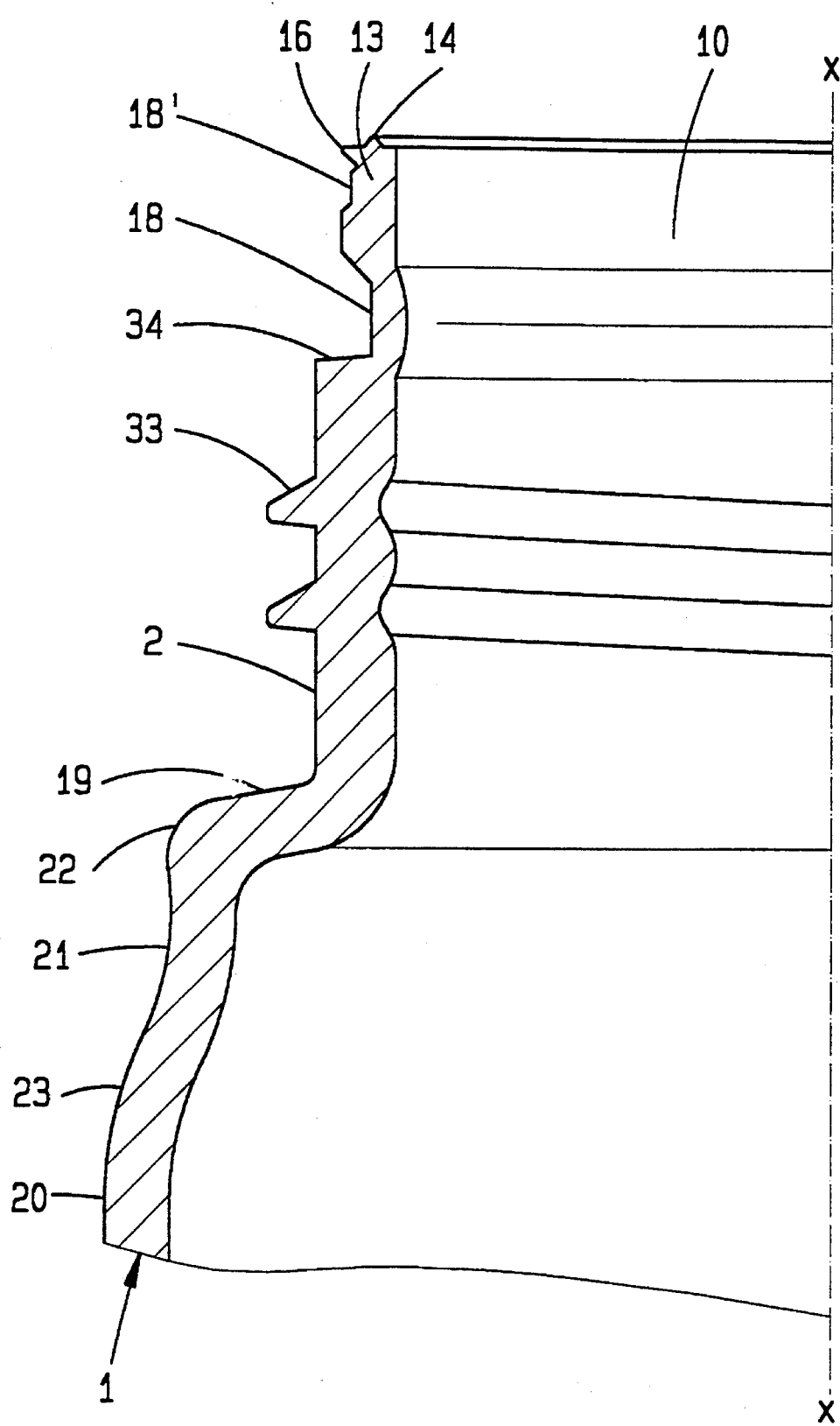
FIG. 14 is an enlarged view of the upper end section of the container bearing a thread plus flange bead.
Figure 15:
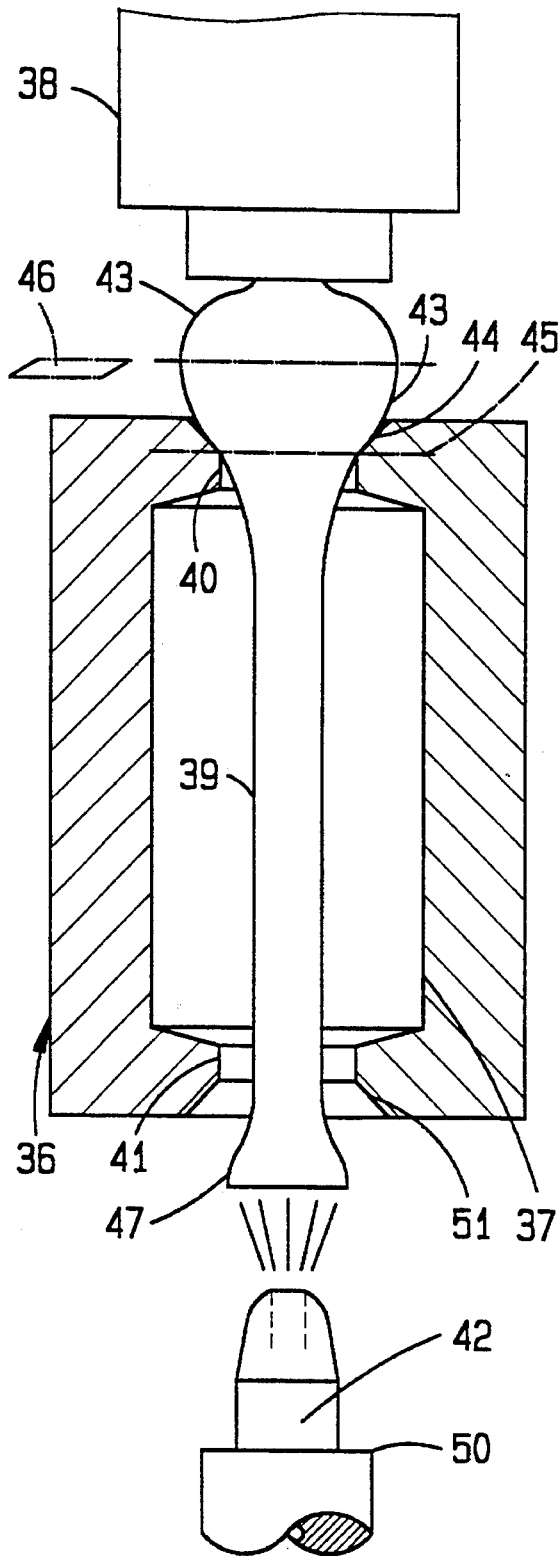
FIG. 15 is a vertical section through a blow mold with plastic tube introduced, for the formation of the container.

The dispenser Sp shown has a substantially cylindrically shaped container 1. The latter is advisedly produced by blowing. Viscoelastic plastic, for instance HDPE, is used.

The upper and lower ends of the container 1, which is designed as a stand-up unit, are narrowed down, each forming a nipple, 2 and 3 respectively. The nipples are also basically of cylindrical shape and extend concentrically to the longitudinal central plane x—x of the container 1 which is of rotational symmetry.

The upper nipple 2 of the container 1 which receives a liquid to be sprayed is reserved for the attachment of a spray nozzle 4. This is a structural unit, shown by itself in FIG. 4, which is irreversibly fastened to the nipple by flanging in accordance with the first embodiment. On the other hand, the pump 5, shown by itself in FIG. 5, is to be attached to the other, lower nipple 3, but this in reversible manner, namely with the use of a screw cap 6. Such a pump 5 has a handle 7. The handle protrudes on the base side of the container 1 and serves, together with the pump 5, to produce a cushion of compressed air above the surface of the liquid present in the container 1. The handle 7 is also cylindrical. Its outside diameter corresponds to that of the container 1. The bottom surface of 7 forms a standing surface.

Described in detail, the attachment of the functional elements described is as follows: The structural unit which represents the spray nozzle 4 has a cap-shaped flange collar 8 preferably made of metal. It is a peripheral annular wall of a support part 9 deep-drawn in S-shape, of rotational symmetry in cross section. The support part extends by a central section in centering fashion into the opening or nipple opening 10 of the container 1. An insertion shaft 12 which is open on the bottom is formed by an upper annular web 11, the flange collar 8 and an inwardly-extending section of the support part 9.

The means on the container side of the flanging for the holding of the spray nozzle 4 on the container 1 consists of a flange bead 13 developed directly on the nipple 2. The flange bead is located on the free end of the nipple 2 and protrudes clearly outward beyond the outer wall of the nipple 2 so that a sort of a tire is present. Its width is adapted to the corresponding width of the insertion shaft 12. After the said flange bead 13 has been gripped over, the lower edge section of the flange collar 8, as can be seen from FIG. 8, is forced, i.e. rolled, under the undercut flank 13' of the flange bead 13. In this way, the spray nozzle 4 is held fast on the housing 1.

In order to obtain an effective seal between the flange-on bead collar 8 and the housing 1 a sealing zone a which is usable if only for the viscoelastic material is provided (see FIG. 8). This sealing zone consists of at least one sealing rib 14 which extends concentrically to the nipple opening 10 and is developed on the upper end surface of the flange bead 13. As can be noted from the drawing of the first embodiment, two closely spaced concentric sealing ribs are present. They come, indirectly or directly, against the base of the insertion shaft 12 of the flange collar 8 formed by the inner side of the annular web 11. The sealing ribs 14 are triangular in cross section and have one side of the triangle rooted in the said end surface of the flange bead 13. In this way, the corners of the triangle assume an exposed position as "cutters".

The indirect sealing application against the sealing ribs 14 is developed in such a manner that the base of the spray-nozzle flange collar 8 is covered also by a conventional sealing ring 15 (see FIG. 7).

A sealing zone a is formed not only by the end surface of the flange bead 13 but also by the region of the outer surface of the flange bead 13 in the manner that an upper cutting-edge-like outwardly tapering rib 16 is provided there (see FIG. 9) and a second, wider rib 17 is present in the vicinity of the lower flank 13' of the flange bead 13. Said rib passes via a transversely convex rounding into the lower flank 13'.

The latter, rolling around the flange collar 8, is pulled with its inner side firmly against the raised portions, i.e. ribs 16, 17, as a result of which a second sealing zone b, spaced from a, is present here. Between rib 16 and rib 17 there remains a short, axially oriented free space 18 between flange collar 8 and flange bead 13.

As can furthermore be noted from the drawing, the upper nipple passes, via a definite shoulder 19, substantially perpendicular to the longitudinal center axis x—x into the outer wall 20 of the container 1. This, however, does not take place directly but after a shaping which produces a circumferential detent groove close to the shoulder. Therefore, an upper bead 22 is present on the extension side. This is followed by the detent groove 21 being produced. The latter then continues over a lower bead 23 into the said cylindrical outer wall 20.

Mating detent means of a protective cap 24 shown in FIG. 2 cooperate with the detent groove 21. The outer wall of said cap is aligned, in correctly attached condition, flush with the outer wall of the container 1. This is also due to a wall offset of the outer wall 20 by an amount corresponding to the thickness of the wall of the protective cap 24. This means that the extension-side bead 22 of the detent groove 21, i.e. the bead facing the upper nipple 2, has a smaller outside diameter than the wider, lower bead 23 which passes directly into the outer wall 20.

With respect now to the lower nipple, the lower nipple 3 bears on its outer wall surface an external screw thread 25 cooperates with a corresponding internal thread of the screw cap 6.

This lower nipple 3 has an axial length which corresponds essentially to the length of the upper nipple 2.

Here, the outer wall 20 of the housing 1 passes into the cylindrical concentrically located lower nipple 3 not over only one shoulder which extends perpendicular to the longitudinal center axis x—x of the container 1 but rather over two step-shaped shoulder surfaces. These substantially flat shoulder surfaces which extend from the lower nipple 3 are designated 26 and 27. The double shoulder 26/27 thus produced can clearly be noted from the drawing. The width of the shoulder surfaces 26, 27 differs. The larger shoulder surface 26 directly adjoins the base side of the lower nipple 3. It can be slightly inclined downward. The shoulder surface 27, on the other hand, is strictly horizontal and therefor directed perpendicular to the longitudinal central axis x—x.

With regard to the difference in width, a dimensioning has been found advantageous in which the radial extent of the shoulder surfaces 26, 27 corresponds, in said sequence, to about one-third and one-seventh, respectively, of the cross-sectional radius R of the container 1 (see FIG. 6).

The radius R, in the case of the size of container shown is 23 mm. The total length of the housing 1 measured over the nipples 2, 3 corresponds approximately to four times the diameter of the housing.

Due to the above-described alignment of the shoulder 19 and shoulder surfaces 26, 27, respectively, an expandable storage acting practically in the manner of a bellows results in these zones upon increased internal pressure of the container 1, so that, as a result of excessive radiation of heat therein, the inner pressure resulting herefrom is advantageously compensated for. The container is therefore substantially pressure-stable.

After removal of the pump 5 from the lower nipple 3, the opening or nipple opening 28 present there serves as filling or refilling hole for the liquid to be sprayed.

After the filling, the ready-for-dispensing position is produced upon the placing of the screw cap 6 on the said nipple 3. By the backward and forward stroke of a pump piston 29, as indicated by the double-ended arrow y in FIG. 5, the pressure cushion can now be created, it effecting the dispensing of the liquid via a riser pipe 30 associated with the spray nozzle 4. This takes place by the action of a pressing force in the direction of the arrow P on a spring-loaded push-button 31 of the spray nozzle 4.

The cylindrically shaped container 1 of the second embodiment, shown in FIGS. 10 and 11, is, in principle, of the same construction, i.e. it forms, on top, the above-described nipple 2 for the attachment of the spray nozzle 4 and, on bottom, the nipple 3 for the attachment of the pump 5.

The structural difference is that now the upper nipple 2 also has a screw thread, designated 33, on its substantially cylindrical outer surface. The spray nozzle, designated generally as 4, has for this purpose, instead of the flange collar 8, the corresponding mating thread on a bell-shaped support part, or it (4) bears a screw cap, such as shown with respect to the pump 7 in the first embodiment described, where it is designated 6.

Further descriptions with respect to the lower nipple 3 can be dispensed with since this zone is practically identical with the situation described in the first embodiment, only that in that case the wider shoulder surface 26 is inclined somewhat more steeply.

Here, therefore, both the spray nozzle 4 and the pump 5 are fastened in a manner which is undetachable in operation from the container 1. For example, the pump 5 is not broken down into two basic parts, as is the case with respect to the prior art described. Optionally, one or the other functional unit can be unscrewed and the one or other nipple opening 10 or 28 thus be used for the filling or refilling of the liquid to be sprayed. For purposes of cleaning, the corresponding attachment can even be entirely eliminated on both ends so that the useful space and the adjoining places can be cleaned well with a brush.

The nipples 2, 3 which make the threaded connection described possible bear screw threads 25 and 33, respectively, which extend in the same direction.

By the simultaneous screwing-on of both functional parts, namely spray nozzle 4 and pump 5, with the grasping of the corresponding threaded sections and screw caps respectively, there is obtained a transfer of the tightening via container 1.

A comparison between upper nipple 2 and lower nipple 3 also shows that different threads are present. On top, there is a somewhat larger screw thread 33 with a somewhat greater distance of the thread ribs from each other. At the bottom, they are closer together. In this way, one avoids the possibility of confusing the operating parts. Such a development is, in particular, fool-proof. Furthermore, from this there result orientation marks, for instance for the automatic mounting of the dispenser Sp.

An even clearer distinguishing feature consists then in the fact that the threaded sections of the container 1, i.e. the nipples 2, 3, are of different diameter. This can also be clearly noted from FIG. 10. The upper nipple 2 which serves for the attachment of the spray nozzle 4 has the larger outside diameter. The difference from the outside diameter of the lower nipple 3 which receives the pump 5 is a few millimeters.

Finally, with regard to the detent means for the detachable attaching of the protective cap 24, the measures here are also identical; without repetition in the text, the corresponding reference numerals have been entered in FIGS. 10 and 11.

With regard to FIG. 11, it should also be mentioned that the section of the outer wall lying closer to the nipple opening 10 is stepped-down so as to reduce the wall. In this way, an annular shoulder 34 is produced. This shoulder serves as screw limiting stop for the spray nozzle 4 and its screw cap and can also be used for the sealing.

Thereupon, the end surface of the upper nipple 2 which extends perpendicular to the longitudinal center plane x—x, and possibly also that of the lower nipple 3, following the planes to the end surface continue into a rib 16. The rib extends tapered outward by a corresponding course of the flank of the rib 16. Between rib 16 and shoulder 34 a short, axially directed free space 18 is present here also.

The inner edge of the nipple 2 facing the nipple opening 10 and possibly also of the nipple 3 is beveled, as also in the embodiment described above.

The third embodiment, shown in FIGS. 12 to 14, incorporates the essential details of the two embodiments described above. The reference numbers have been applied accordingly and therefore also read on the second embodiment in many instances.

The third embodiment shows a combination of the two previous embodiments insofar as the flange bead 13 present in the first embodiment is produced in the region of the upper opening 10 on the container 1 which has two threaded ends. The development is such that the said flange bead 13 seated on the free end of the upper nipple 2 does not protrude radially beyond the screw thread 23. The reduced diameter can be clearly noted from FIG. 14. The flange bead 13 has at most an outer diameter which takes into consideration an intermediate position of the cylindrical wall of the flange collar 8. In the attached condition of the spray nozzle, the outer surface of the flange collar 8 is inward of the outer surface of the nipple 2.

Furthermore, between the flange nipple 13 and the nipple 2 there is also a groove-like circumferential space 18 for the entrance of the holding edge of the flange collar 8. Here, there apply, in detail, also further explanations given with reference to FIG. 9, that the outwardly directly end edge of the flange collar forms only a single sealing rib 14 for the creation of the sealing zone a.

The rib 16 which protrudes tapered on the outer wall side continues in the direction of the container 1 or in the direction of the shoulder 19 further into a comparatively shallow groove 18' comparable to the space 18, the radial depth of which is clearly less than that of the free space 18 between flange bead 13 and nipple 2 (see FIG. 14). As can also be noted from FIG. 14, the peripherally tapering rib 16 passes first of all, via a notch-valley-like depression, into the somewhat higher located base of the shallow groove 18'. The shallow groove 18' is of trapezoidal shape in cross section, with outwardly directed divergence of its flanks.

The method of producing the container 1 which has been shown and described will be explained below with reference to FIGS. 15 to 18. It is to be pointed out in advance that the details of the nipples 2, 3 present at both openings 10 and 28 are not shown there, in the interest of a clear description of the method itself.

The more diagrammatic showing shows a blow mold 36. Its vertically oriented parting plane in mold halves is covered by the raw material for the container 1 which has entered. The blow mold has a mold cavity 37 which corresponds to the contour of the container 1 to be formed.

Above the open blow mold there is a so-called tube head

38. It feeds a plastic tube 39 to the blow mold 36. It is produced by extruder and is in each case transported as section in full length of the hollow body of the container to be formed.

The attachment of a corresponding section of the plastic tube 39 is effected in an upper gate 40 of clearly reduced cross section of the blow mold 36. The gate 40 is adapted to the cross section, etc., of the upper nipple 2.

At the bottom of the blow mold 36 there is a second gate, designated 41. It is developed in the same manner, and is therefore adapted to the lower opening to be formed of the container 1. The basic cross section of the plastic tube 39 is clearly less than the inside dimension of the gates 40, 41.

After closing the blow mold 36, supporting air is injected into the plastic tube 39 which is open at its bottom. This is effected via a coaxially aligned lower blow mandrel in the form of a closure mandrel 42. The air can also be blown in from above, and even from below and above at the same time.

This blow/closure mandrel 42 produces sufficient pressure within the plastic tube 28 to lead to a definite widening of the tube wall in front of the tube head 38, and therefore between the narrowed upper gate 40 and the bottom of the said tube head 38. This widening region is referred to as balloon-like blister 43.

This blister 43 which is produced predominantly in the thermally optimally equipped region produces such a large widening that the plastic tube is held fast, practically secured against sliding, on the upper edge of the closed blow mold 36, even though there is still a certain backward movement as can be noted from FIG. 17.

The application therefore takes place at a transition place between the substantially cylindrical gate 40 and a frusto-conically shaped funnel wall arranged above it.

With rather large openings 10 of the container 1, for instance ones which result in a neck diameter of more than 30 mm, a vacuum situation is created by way of support and maintains the calyx-shaped development of the lower half of the blister by vacuum. The corresponding plane is shown by dot-dash line in the drawing and designated 45. There is concerned, for instance, a centrally oriented channel system with connection to a timed vacuum source, not shown.

The resultant blister 43 is cut, in one way or another, perpendicular to the vertical plane of extent of the plastic tube 39. The cutting, as can be noted from FIG. 15, takes place in the region of the largest diameter of the blister 43. The corresponding cutting knife 46 of a cutting device (not shown in detail) enters into the region of the vertical space between the bottom of the tube head 18 and the top edge of the blow mold 36.

Figure 16:
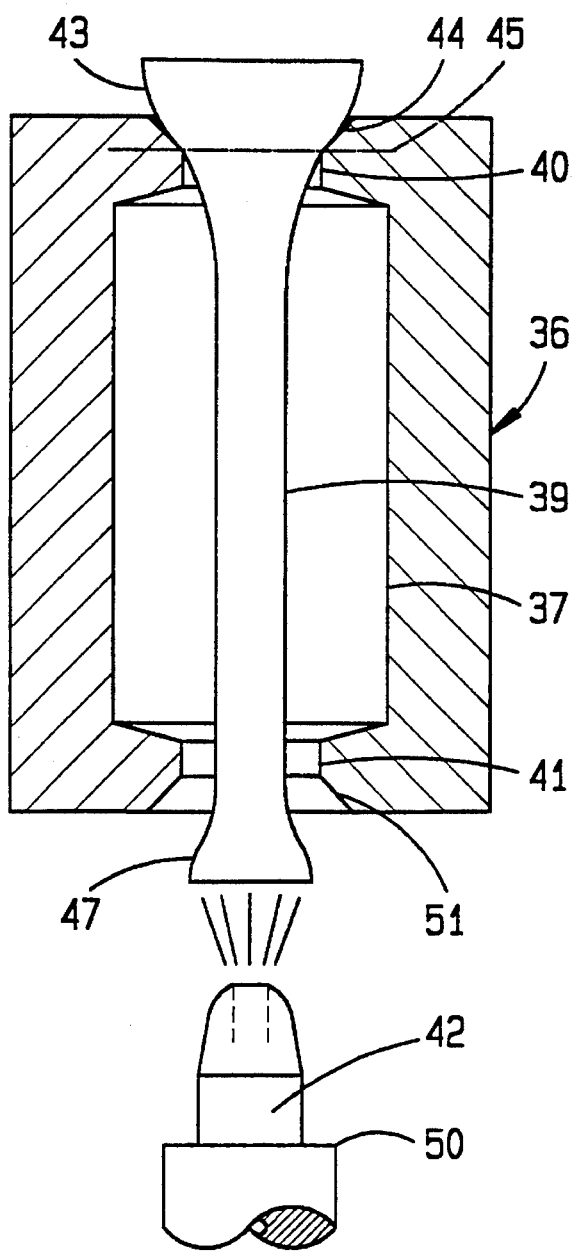
FIG. 16 is a view similar to that of FIG. 15, FIG. 16 showing the blow mold after a cutting off of the plastic tube.

After the cutting of the endlessly fed, intermittently stopped plastic tube 39, the next station is present, as can be noted from FIG. 16.

It remains still to be pointed out that, by the cut described, a widened zone 47 remains also on the tube-head end the now new lower end of a section of the plastic tube 39, which zone extends in the manner of a connecting funnel in front of the mouth of the closure mandrel 42, so that the support air is introduced focused in order to create the blister 43 of the next section of the plastic tube.

The lower blow-closure mandrel 42 moves along with this. While still below the head, further compressed air is blown into the plastic tube 19 through this lower blow mandrel 42. The plastic tube is further widened in this connection within the mold cavity 37. In this connection it increasingly approaches the blow/closure mandrel 42 of the lower gate 41, which now serves as sort of stopper function. Its dome-shaped end which widens downward and then conically enters into the widening zone 47. In this connection, the lower nipple 3 is calibrated. The inward moving closure mandrel 42, produces more and more in a larger cross section, and presses the tube wall against the shaping structures of the gate 41 and, therefore, together with the bulging of the body, produces, at the same time via the radial pressing in the region of the opening 28 of the nipple 3, the thread 25 or similar holding development.

In this connection, the cutting of the excess material of the plastic tube 39 takes place there, superimposed on this. There is concerned the outwardly directed end portion of the widening zone 47, forming the so-called neck butt 49. The cutting is effected via a clenching ring 50 on the blow/closure mandrel 42. The clenching ring 50 moves as cutting edge against a concentric funnel wall 51 also developed on the lower end of the blow mold 36. This wall widens towards the lower edge of the blow mold 36. Both funnel walls 44, 51 have a wall angle of 45° with respect to the vertical longitudinal center axis of the blow mold 36.

The blow mold moves into the next station, shown in FIG. 17. It comes there below an upper blow mandrel 52. While this upper blow mandrel 52 moves vertically into the widening of the upper end of the plastic tube 39 serving for its dependable suspension, compressed air is also blown into the plastic tube through this upper blow mandrel 52. With the entrance of the end of the blow mandrel 52, which is also developed in dome shape and then with increasing cross section (cone), the mouth there of the container 1 to be formed is calibrated. Referring to the embodiment in accordance with FIG. 14, the external thread 33 is therefore produced by peripheral imprint on the mold wall, i.e. in the gate 40, and at the same time forms the other holding development in the form of the flange bead 13.

The gate 40 forms the upper opening neck region of the container 1, and the gate 41 forms the lower opening neck region thereof.

Finally, the cutting off of the excess, i.e. the neck butt 54, is also effected by a clench ring 53 developed on the upper blow mandrel 52. The knife-like clench ring 53 advance in corresponding manner against the funnel wall 44.

After removal of the two neck butts 49, 50 and the opening of the blow mold 36, a completely finished container 1 is available, formed in simple manner from a tube section which hangs freely in the mold and which, without lateral squeezing such as necessary for instance upon the cutting off a deadhead, results in a hollow body with two extremely spaced openings. This body is completely seamless and produced without any additional work. The circumstances which can be made use of in the case of thermally suitable plastic material are optimally applied both with regard to flow technique and with respect to the pressing. Both mouths are smooth in the inside diameter and the flat surface is smooth and without any traces of machining. Therefore, completely smoothly compressed surfaces are present from the blow mandrels.

The, for instance, milky or otherwise colored plastic tube 39 can have a clear-view strip extending along it, so that the extent of filling or subsequent filling can be noted on the completely blown container 1.

I claim:

1. A container for spraying liquid, comprising a tubular container having a top side and a base side, the container including an upper nipple at said top side and a lower nipple at said base side, said upper nipple having an encircling bead and providing a first opening into said container, said lower nipple having a spiral thread and providing a second opening into said container;

a spray nozzle disposed on the top side of the container and secured to said upper nipple by said bead;

a pump extending into said container from said base side, said pump having a piston terminating in a handle and being encircled by a screw cap which engages said spiral thread of said lower nipple for securing said pump to said container, said handle of the pump extending beyond the base side of the container in order to produce a compressed-air cushion above a surface of liquid in the container;

said spray nozzle has a flange collar encircling said upper nipple of said container, and said spray nozzle is fastened by a gripping over of said flange collar on the container; and an outer surface of the bead of the upper nipple bears circumferential ribs.

2. A container for the spraying of liquid, comprising a spray nozzle disposed on a top side of the container;

a pump having a handle, the handle of the pump extending from a base side of the container into the container in order to produce a compressed-air cushion above a surface of liquid in the container;

wherein the container is developed substantially in tubular form;

the spray nozzle and the pump are fastened securely to the container during operation of the spray nozzle and during operation of the pump;

the container has on its top side an extension in the form of an upper nipple and terminates in a flange bead for holding the spray nozzle; and said upper nipple has on a base side thereof a concave shoulder with an undercut detent groove.

3. A container according to claim 2, wherein said detent grove has an upper bead and a lower bead, the upper bead having a smaller outside diameter than the lower bead of the detent groove, the lower bead passing directly into a cylindrical outer wall of the container.

4. A container according to claim 3, further comprising a lower nipple encircled by a screw thread and located at the base side of the container, and a double shoulder located at the base side of the container; and wherein the double shoulder comprises two shoulders each of which shoulders has a substantially flat shoulder surface, and the lower nipple passes via the double shoulder into the cylindrical outer wall of the container.

5. A container according to claim 4, wherein radial extents of lower and upper shoulder surfaces of the double shoulder have magnitudes of about one-seventh and about one-third, respectively, of a cross-sectional radius of the container.

6. A container according to claim 4, wherein a larger of the shoulder surfaces lies directly on a base side of the lower nipple.

7. A container according to claim 4, wherein the upper nipple and the lower nipple are approximately the same length.

8. A container for the spraying of liquid, comprising a spray nozzle disposed on a top side of the container;

a pump having a handle, the handle of the pump extending from a base side of the container into the container in order to produce a compressed-air cushion above a surface of liquid in the container;

wherein the container is developed substantially in tubular form;

the container comprises a first and a second outwardly protruding connecting piece respectively on a top and on a bottom of said container, said first connecting piece receiving said spray nozzle, and said second connecting piece having a threaded attachment for engagement with said pump, said spray head and said pump being developed separately from said container; and the first and the second connecting pieces are integrally formed on the container and are of different diameter.

9. A container for the spraying of liquid, comprising a spray nozzle disposed on a top side of the container;

a pump having a handle, the handle of the pump extending from a base side of the container into the container in order to produce a compressed-air cushion above a surface of liquid in the container;

wherein the container is developed substantially in tubular form;

the container comprises a first and a second outwardly protruding connecting piece respectively on a top and on a bottom of said container, said first connecting piece receiving said spray nozzle, and said second connecting piece having a threaded attachment for engagement with said pump, said spray head and said pump being developed separately from said container;

the spray head has a flange collar, the first connecting piece comprises a bead developed integrally on the first connecting piece, the spray nozzle is fastened by engagement of the flange collar around the bead of the first connecting piece, the pump has a screw cap, and the second connecting piece has a screw thread for receiving the screw cap of the pump in order to hold the pump on the second connecting piece; and an outer surface of the flange bead bears circumferential ribs developed integrally with the container.

10. A container for spraying liquid, comprising a tubular container having a top side and a base side, the container including an upper nipple at said top side and a lower nipple at said base side, said upper nipple having an encircling bead and providing a first opening into said container, said lower nipple having a spiral thread and providing a second opening into said container;

a spray nozzle disposed on the top side of the container and secured to said upper nipple by said bead;

a pump extending into said container from said base side, said pump having a piston terminating in a handle and being encircled by a screw cap which engages said spiral thread of said lower nipple for securing said pump to said container, said handle of the pump extending beyond the base side of the container in order to produce a compressed-air cushion above a surface of liquid in the container; and an outer surface of the bead of the upper nipple bears circumferential ribs.

* * * * *